(12) United States Patent
Stockhaus et al.

(10) Patent No.: US 6,575,790 B2
(45) Date of Patent: Jun. 10, 2003

(54) DETACHABLE CONNECTING SYSTEM

(75) Inventors: Andreas Stockhaus, Berlin (DE);
Klaus Schulz, Berlin (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/815,654

(22) Filed: Mar. 23, 2001

(65) Prior Publication Data
US 2001/0016442 A1 Aug. 23, 2001

Related U.S. Application Data

(63) Continuation of application No. PCT/DE99/03089, filed on Sep. 22, 1999.

(30) Foreign Application Priority Data

Sep. 23, 1998 (DE) .......................................... 198 43 627

(51) Int. Cl.⁷ ...................... H01R 24/00; H01R 13/625; H01R 13/627
(52) U.S. Cl. ........................ 439/630; 439/357; 439/347
(58) Field of Search ................................ 439/347, 357, 439/630, 633, 680, 358

(56) References Cited

U.S. PATENT DOCUMENTS

| 5,773,763 A | 6/1998 | Stachulla |
| 5,930,426 A | 7/1999 | Harting et al. |
| 6,056,579 A * | 5/2000 | Richards, III et al. ...... 439/358 |

FOREIGN PATENT DOCUMENTS

| DE | 44 40 455 C2 | 9/1996 |
| DE | 296 07 793 U1 | 10/1997 |

* cited by examiner

Primary Examiner—Tulsidas Patel
Assistant Examiner—Chandrika Prasad
(74) Attorney, Agent, or Firm—Laurence A. Greenberg; Werner H. Stemer; Ralph E. Locher

(57) ABSTRACT

A detachable connecting system includes a component and a mount having cooperating guides which effect a defined movement of the component in a mounting direction into a connecting position when a connection is established. An underside of the component has a locking element which engages another corresponding locking element in the connecting position. The other locking element is disposed at a free end of a resilient tongue disposed below the component. In the connecting position, an actuation region of the free end of the tongue is accessible from a front end of the component.

7 Claims, 3 Drawing Sheets

DETACHABLE CONNECTING SYSTEM

CROSS-REFERENCE TO RELATED APPLICATION

This application is a continuation of copending International Application No. PCT/DE99/03089, filed Sep. 22, 1999, which designated the United States.

BACKGROUND OF THE INVENTION

Field of the Invention

The invention relates to the field of mounting electronic components or modules, in particular electrooptical modules (so-called transceivers). In order to provide for the mounting of such modules on carriers, in particular printed circuit boards provided with conductor tracks and terminal contacts, a user increasingly requires modules which can be placed on the printed circuit board, and made contact with, in a comparatively free and unrestricted manner. There is a requirement, in particular, for module structures and suitable connecting systems which allow the modules to be inserted horizontally, in a straightforward manner, into suitable mounts which, in addition to making electrical contact with the module, also ensure sufficiently tension-resistant mechanical fixing.

U.S. Pat. No. 5,734,558 discloses an optoelectronic component with an associated mount which is disposed on a top surface of a printed circuit board. The component and the mount are provided with interacting fixing devices. In that case, the component housing has resilient latching arms on both narrow sides which are free with respect to the optical terminal side. The latching arms are provided on the outside with latching tabs which latch into corresponding recesses of the mount when the component is introduced into an end position (connecting position) parallel to the surface of the carrier. In that position, the component is connected mechanically to the mount, in which case, at the same time, a male connector strip, that is disposed on that side of the component which is located opposite the optical terminal side, is given an electrical connection with a female connector strip of the mount.

Free ends of the latching arms have to be moved manually towards one another until the latching tabs are released from the recesses of the mount, for mounting and for removal. The known component requires a considerable amount of lateral access space to provide for the mounting and removal. Since a sufficient material cross section also has to be provided over the height of the narrow side for the latching arms, and a sufficient height of the operating surfaces (end regions of the latching arms) is necessary, the overall height of the component cannot be reduced below dimensions which are sufficient in this respect.

SUMMARY OF THE INVENTION

It is accordingly an object of the invention to provide a detachable connecting system, which overcomes the hereinaforementioned disadvantages of the heretofore-known devices of this general type, which has an extremely low overall height while being very user-friendly and which does not prevent a reduction in component height.

With the foregoing and other objects in view there is provided, in accordance with the invention, a detachable connecting system having a component and a mount which is disposed on a top surface of a carrier. The component and the mount are equipped with interacting guides which, when the connection is formed, bring about a guided movement of the component, in the mounting direction, relative to the mount, and parallel to the top surface of the carrier, into a connecting position. The component has a locking element on its underside, which is directed towards the carrier. The mount has a resilient tongue which extends, counter to the mounting direction, beneath the component, and has a locking partner at a free end of the tongue. The locking partner latches with the locking element of the component in the connecting position. An actuating region of the free end of the tongue is accessible from an end surface of the component in the connecting position.

A major advantage of the invention is a locking mechanism which acts resiliently on the component from beneath and has an extremely low overall height, of much less than 1.2 mm. The locking partner can nevertheless absorb considerable tensile loading in the horizontal direction. This, for example, provides a reliable mechanical fixing and connecting system for electrooptical modules, onto one end of which optical-conductor connectors can be plugged for optical coupling. It is possible for the optical-conductor connectors to be subjected to considerable tensile loading (of typically 40 to 60 N). A further major advantage of the invention is the accessibility of the actuating region from the component end surface, which is preferably formed as an optical coupling surface. As a result, it is possible for the component and the mount to be disposed directly alongside adjacent component parts without it being necessary to provide lateral access spaces alongside the component for mounting and removal. A further advantage is that the resilient tongue, which is disposed beneath the component, may have a width which is sufficient for actuation without rendering the component height subject to the restrictions outlined in the introduction.

In accordance with another feature of the invention, the resilient tongue is formed of metal and has mounting surfaces with which contact is made on the top surface of the carrier. A major advantage of the conductive tongue, which is, in particular, in the form of a single-piece metal punched part, is that, with extremely small component cross sections, the connection can nevertheless absorb very high tensile loading. Moreover, in the event of actuation overloading, the metal tongue is very robust and tends more to deformation (reversibly) than to fracturing. With excessive tensile forces, the locking element of the component would tend to flex but, in contrast, the mount, which is mounted on the printed circuit board and is difficult to replace, would remain intact. A further considerable advantage is that the conductive tongue may serve for electrical component shielding in that, in the locked state, it is connected electrically to corresponding shielding plates of the component and, for its part, is connected to shielding potential.

In accordance with a further feature of the invention, for this purpose, contact is also made with the tongue on the top surface of the carrier through its mounting surfaces.

In accordance with an added feature of the invention, which is preferred from a production point of view, another end of the tongue is accommodated by a retaining block of the mount. The retaining block also has at least parts of the guides of the mount.

In accordance with an additional feature of the invention, which is a particularly user-friendly configuration, the actuating region of the free end of the tongue is bent down in the direction of the top surface of the carrier and, in the connecting position, projects beyond the component end surface.

In accordance with a concomitant feature of the invention, which is particularly preferred in terms of both mounting and, in particular, removal, the component is moved into the connected end position counter to spring preloading. It is preferably possible in this case for the spring preloading to be produced by a spring disposed on the mount. This is particularly favorable from the point of view of production and mounting and, as far as the component-housing shape is concerned, allows a wide range of variants. The spring preloading is preferably selected in this case in such a way that, when the component is introduced into the mount, it becomes noticeable only over the last part of the fitting distance. For this purpose, it is possible to place a compression spring at the far end of the mount, as seen in the mounting direction. The compression spring comes into contact with the component or with an end surface of the component housing, just before the end position is reached. This means that the user can easily and conveniently be made aware that the component is just about to reach the end position. The spring preloading has considerable advantages, in particular for removal of the component. That is because, once the interacting locking partners have been unlocked, the component is ejected at least part way counter to the mounting direction, with the spring being relieved of stressing. As a result, on one hand, the component is reliably unlocked and, on the other hand, the component can be gripped more easily.

Other features which are considered as characteristic for the invention are set forth in the appended claims.

Although the invention is illustrated and described herein as embodied in a detachable connecting system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
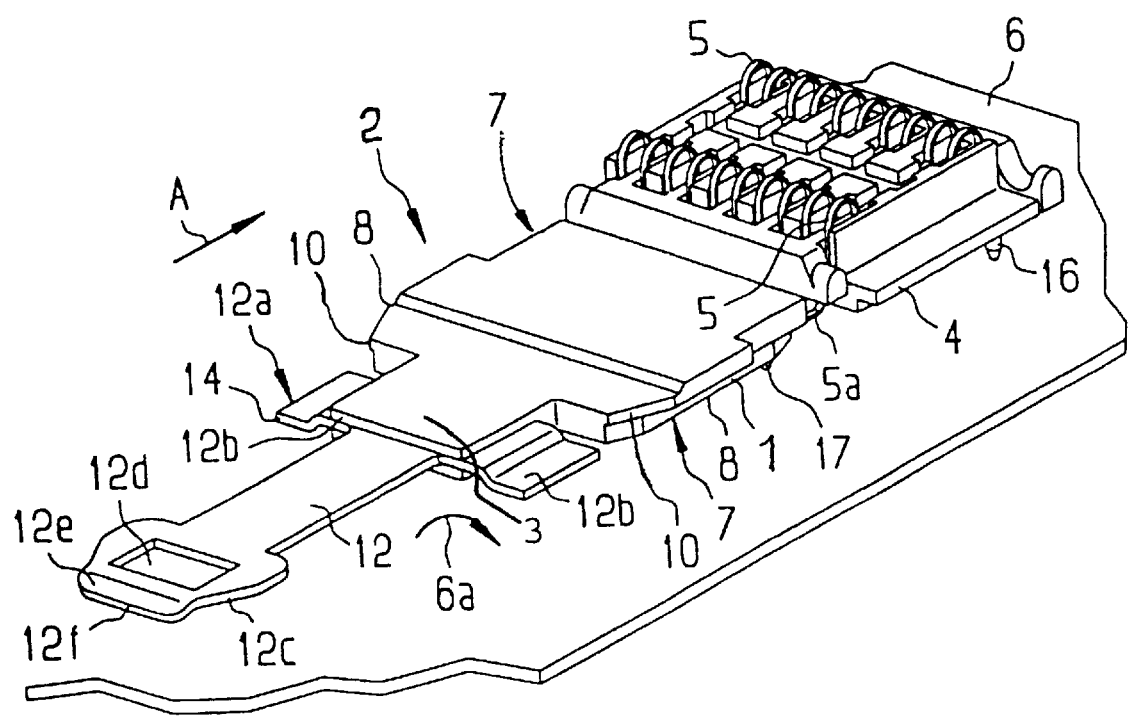
FIG. 1 is a fragmentary, diagrammatic, perspective view of a mount.

Referring now to the figures of the drawings in detail and first, particularly, to FIG. 1 thereof, there is seen a mount 2 which includes a retaining block 1. An integral holder 3 is formed in a front region, as seen in a mounting direction A. The retaining block 1 is adjoined in a rear region by a multiple electrical connector 4 with a multiplicity of electrical contacts 5. The electrical contacts 5 have a resilient structure and each has an end 5a which is constructed for surface solder mounting. In this way, the multiple connector 4 may be connected, by way of its contact end 5a, to non-illustrated associated connecting Bolder contact surfaces on a top surface 6a of a carrier in the form of a printed circuit board 6. The contacts 5 serve, for their part, to make electrical contact with electrical contacts disposed on an underside of a component which is to be connected to the mount.

The mount 2 has two narrow sides 7 having undercuts 8 which interact as guides 10 with corresponding rail-like sections of a component housing, in a manner which will be explained in more detail below. The guides 10 ensure that a component which is introduced in the mounting direction A executes a defined horizontal movement relative to the mount 2 to form a connection with the terminal part 4 and a resilient metallic tongue 12.

The mount 2 is preferably produced as a plastic injection molding and its integral holder 3 is retained at a rear end 12a of the tongue 12 in the front region 14. Two contact surfaces of the tongue 12 which are in the vicinity of the mount, extend laterally and form mounting surfaces 12b which are soldered to non-illustrated ground contact connections that are formed on the top surface 6a of the carrier 6. The tongue may thus serve for the electrical shielding of a correspondingly shielded component. The mount is fastened in a predetermined position on the carrier 6 by virtue of the solder connections and positioning pins 16, 17. A resilient free end 12c of the tongue 12 is provided with an essentially rectangular recess 12d which forms a locking partner for a locking element of the component, in a manner which will be explained hereinbelow. An actuating region 12e which is also formed at the free end 12c of the tongue 12 includes an actuating surface 12f that is bent downward in the direction of the carrier 6.

Figure 2:
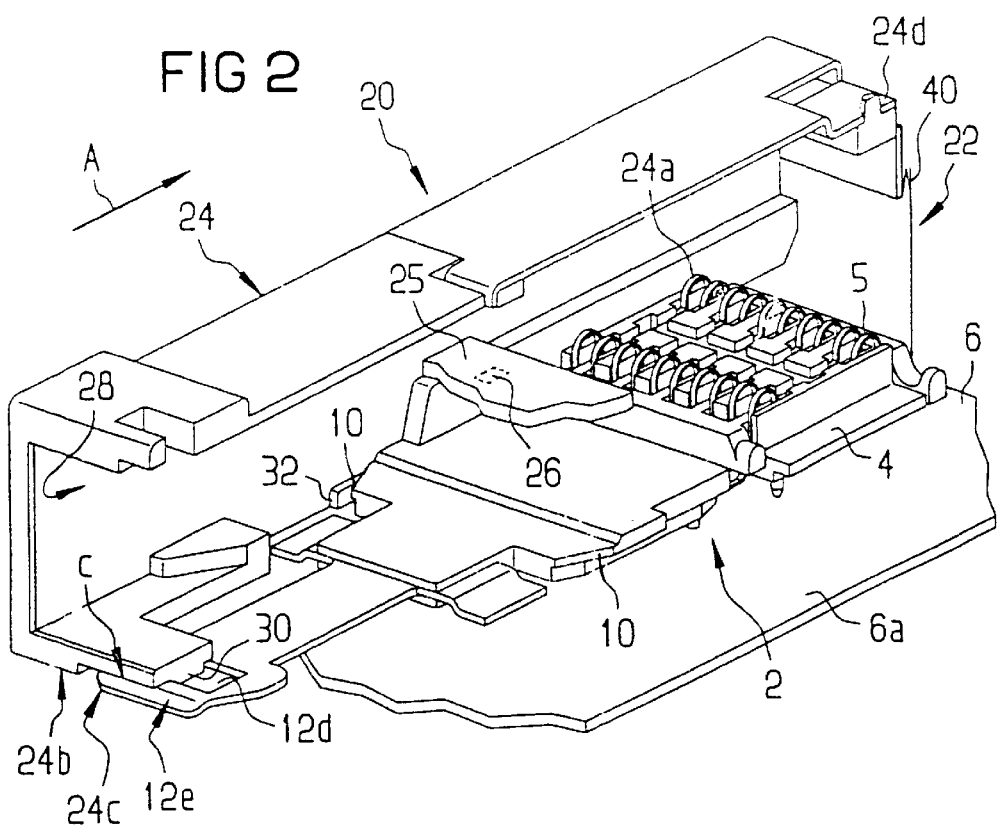
FIG. 2 is a diagrammatic, perspective view of a connecting system according to the invention, with a component and the mount according to FIG. 1 being illustrated in part.

FIG. 2 is a vastly simplified illustration which, in particular, omits the electrooptical and electronic component parts, but shows a component 20 which is fully connected to the mount 2 disclosed in FIG. 1 and has reached a connected end position 22 (connecting position). The component 20 includes a housing 24 which contains a diagrammatically illustrated printed circuit board 25 that is mounted on placement surfaces 24a and carries electronic component parts 26 of the component 20. Non-illustrated terminal contacts of the printed circuit board 25 are connected electrically, in the illustrated end position 22, to associated contacts 5 of the multiple connector 4, in order to provide signal and supply lines for the component. A front end 28, as seen in the mounting direction A, of the housing 24 is constructed for accommodating electrooptical connectors which, in a manner that is known per se and is thus not shown specifically, are aligned with electrooptical transducers of the component 20.

Figure 2A:
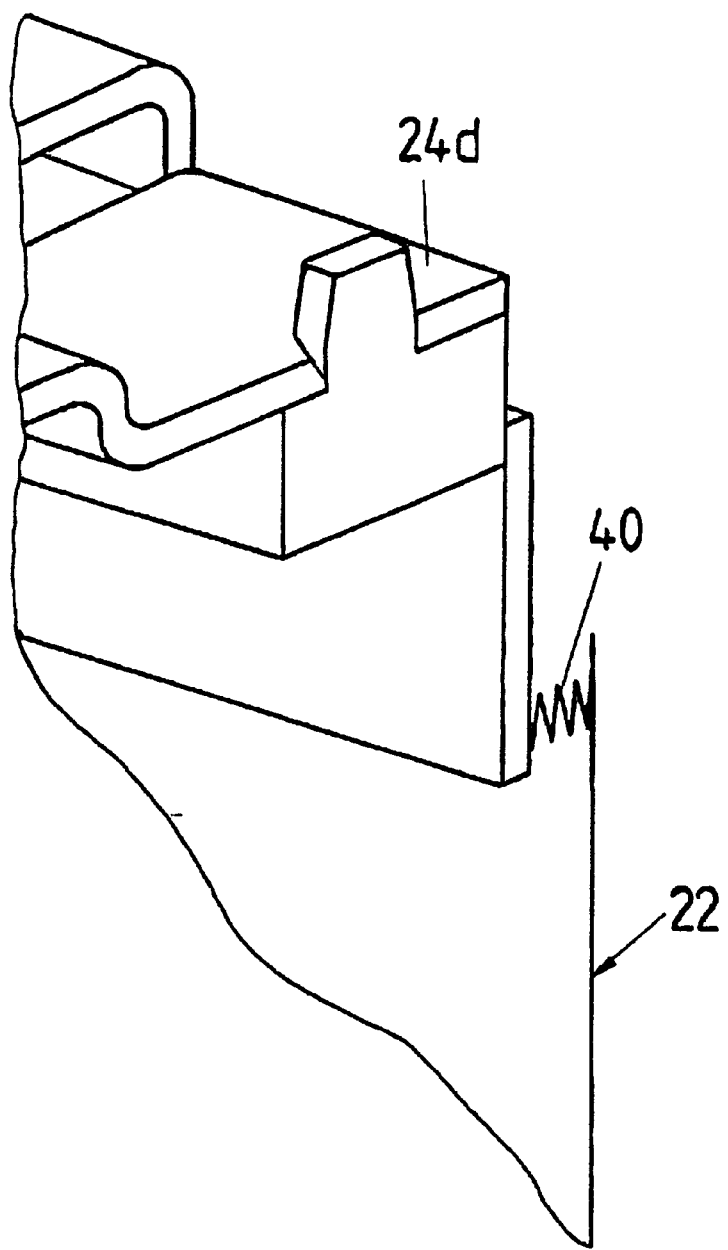
FIG. 2a is an enlarged view of the back part of the component with the spring.

The housing 24 of the component 20 has a locking element on its underside 24b, which is directed towards the carrier 6. That locking element is constructed as a latching tab 30 which extends away. The housing 24 also has guides 32 in the form of inner rails which interact with the guides 10 of the mount 2, guide the component during the connecting operation and retain the same in a defined vertical position relative to the mount. In the connecting or end position 22 which is illustrated, the locking element 30 is latched into the locking partner 12d In the event, for example, of the non-illustrated optical connector being subjected to tensile loading, the component 20 in reliably retained in its position by the locking mechanism. The actuating region 12e of the tongue 12 is accessible beneath the housing 24, in the front or end region 28, through a housing recess 24c. The region 12e may preferably project slightly beyond the front or end region 28 of the component. As is only diagrammatically indicated in the rear region of the mount 2, as seen in the mounting direction A, it is possible to provide a compression spring 40 (see FIG. 2a) which is supported on a rear end 24d of the housing 24 by preloading a spring, in the end position.

Figure 3A:
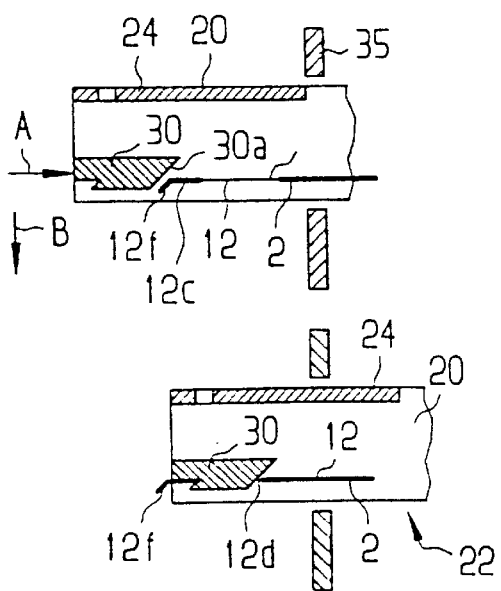
FIGS. 3a and 3b are fragmentary, partly-sectional, elevational views respectively illustrating production and release of a connection between the component and the mount.
Figure 3B:
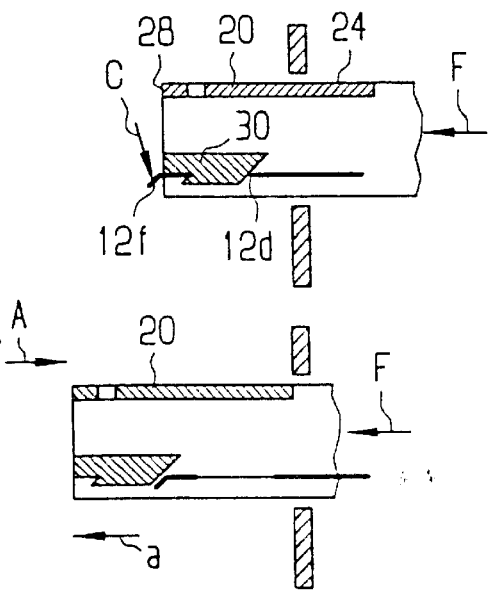

The locking and unlocking operations for respectively mounting and removing the component are explained in more detail hereinbelow in conjunction with FIGS. 3a and 3b, in which the elements concerned are illustrated diagrammatically. During mounting, the component 20 with its housing 24 is pushed in, in the mounting direction A, through a rear wall 35 of a receiving framework, from which the mount 2 partially projects. In particular, the tongue 12 projects by way of its free tongue end 12c. As is shown in the top part of FIG. 3a, an inclined slope 30a on the tab 30 shown in FIG. 2 finally comes into contact with the actuating surface 12f of the tongue 12. As a result, the tongue is deflected vertically downwards in the direction of an arrow B until the tab 30, as the locking element of the component 20, has penetrated fully into the locking partner 12d in the form of the opening in the tongue 12 and (as is illustrated diagrammatically in the bottom part of FIG. 3a) the connecting position 22 has thus been reached.

In order to provide for disassembling and removing the component 20, the actuating surface 12f, which projects beyond the front end surface 28, is deflected downwards in the direction of an arrow C, in the direction of the carrier 6 shown in FIG. 2. This deflection occurs to such an extent that the locking element 30 is released from the locking partner 12d. FIG. 3b shows that as a result of a force F of the spring 40 shown in FIG. 2 acting on the rear end or region 24d of the housing 24, the component 20, during the unlocking process, is ejected at least part way counter to the mounting direction A. As a result, on one hand, the unlocking of the component can be recognized clearly and, on the other hand, the front region of the component can be gripped easily.

We claim:

1. A detachable connecting system, comprising:
    a carrier having a top surface;
    a component having an end surface, an underside and a locking element disposed at said underside and directed towards said carrier;
    a mount disposed on said top surface of said carrier;
    said component and said mount having interacting guides effecting a guided movement of said component relative to said mount in a mounting direction parallel to said top surface of said carrier, into a connecting position to form a connection; and
    said mount having a resilient tongue extended counter to said mounting direction beneath said component, said tongue having a free end, said free end having a locking partner latching with said locking element of said component in said connecting position, and said free end having an actuating region accessible from said end surface of said component in said connecting position.

2. The connecting system according to claim 1, wherein said resilient tongue is formed of metal and has mounting surfaces with which contact is made on said top surface of said carrier.

3. The connecting system according to claim 1, wherein said resilient tongue has another end, and said mount has a retaining block accommodating said other end of said tongue and having at least parts of said guides of said mount.

4. The connecting system according to claim 1, wherein said actuating region of said free end of said tongue is bent down towards said top surface of said carrier and projects beyond said end surface of said component in said connecting position.

5. The connecting system according to claim 1, wherein said component is moved into said connecting position counter to a spring preloading between said component and one of said mount and said carrier.

6. The connecting system according to claim 5, including a spring disposed on said mount and producing said spring preloading.

7. The connecting system according to claim 1, wherein said locking element is a tab oriented towards said top surface of said carrier in said connecting position, and said locking partner is an opening in said free end of said tongue.

* * * * *